United States Patent Office 3,655,783
Patented Apr. 11, 1972

3,655,783
SELECTIVE EXTRACTION OF META-CHLOROTOLUENE
John D. Bacha, Monroeville, and Charles M. Selwitz, Pitcairn, Pa., assignors to Gulf Research & Development Company, Pittsburgh, Pa.
No Drawing. Filed Dec. 3, 1969, Ser. No. 881,849
Int. Cl. C07c *25/04*
U.S. Cl. 260—650 R          13 Claims

ABSTRACT OF THE DISCLOSURE

Meta-chlorotoluene is separated from a mixture containing the three isomers thereof by contacting the mixture with hydrogen fluoride, boron trifluoride and a light hydrocarbon, such as hexane, at a temperature below about 60° C.

---

This invention relates to a method of separating meta orientated haloalkyl benzenes from isomeric mixtures thereof and, more particularly, to a method of separating meta-chlorotoluene from a mixture of its three possible isomers.

Generally speaking, conventional processes for preparing chlorotoluene result in the simultaneous formation of the three isomers thereof, namely, ortho-, meta- and para-chlorotoluene. For example, it is known that the conventional chlorination of toluene results in an isomeric mixture of chlorotoluene predominating in the ortho- and para-isomers thereof and containing relatively insignificant amount of meta-chlorotoluene. It is also known, as disclosed in our copending application, Ser. No. 785,793, filed Dec. 20, 1968 now U.S. Pat. No. 3,560,579 which issued Feb. 2, 1971, that the isomerization of ortho- and/or para-chlorotoluene to the meta-orientated isomer is incomplete, and that in practice such isomerization yields an isomer distribution of approximately 50/37/13 percent, ortho-/meta-/para-chlorotoluene, respectively.

Of the three chlorotoluene isomers, meta-chlorotoluene is of considerable commercial importance since it can be conveniently hydrolyzed to meta-cresol which, in turn, reacts favorably with formaldehyde to form desirable phenolic resins. Accordingly, it is desirable either to produce meta-chlorotoluene singly or to selectively remove the meta orientated chlorotoluene from a mixture of the three isomers thereof. In this connection, it is possible to prepare the individual chlorotoluene isomers from other substituted toluene derivatives such as the toluidines, but the cost of such techniques is commercially prohibitive. Thus, meta-chlorotoluene is generaly produced commercially by processes which yield the meta-, ortho- and para-isomers.

Heretofore, it has been difficult to selectively isolate or remove meta-chlorotoluene from ortho- and para-chlorotoluene. For example, the almost identical volatilities of the chlorotoluene isomers preclude their separation by inexpensive distillation techniques. In addition, their similar solubilities have precluded selective extraction. In this regard, there has been no prior art disclosure as to the possibility of extracting meta-chlorotoluene from the para- and ortho-isomers, and at least one prior art disclosure dealing with the removal of ortho- from para-chlorotoluene by solvent extraction indicates only limited success. Likewise, atempts to overcome the difficult separation of the chlorotoluene isomers by first hydrolyzing the entire chlorotoluene mixture to cresols and then separating the cresol isomers has proven economically unfeasible. Although the meta-cresol separation is in and of itself more economical than the meta-chlorotoluene separation, the economics of the overall process is unfavorable since hydrolysis of the entire chlorotoluene mixture yields large amounts of the less valuable and non-isomerizable ortho-cresol.

Accordingly, it is desirable to provide a simple economical and reliable method of selectively removing meta-chlorotoluene from a mixture of chlorotoluene isomers which avoids the above discussed prior art difficulties.

In accordance with the present invention, we have found that meta-chlorotoluene can be selectively removed from ortho- and para-chlorotoluene, and from disproportionation deterrents or other organic diluents which may be admixed therewith, by contacting the isomer mixture with HF, $BF_3$ and an inert organic material having a density lower than that of the respective chlorotoluenes, such as, for example, butane, pentane, hexane, heptane, octane, benzene, 1-chlorododecane, and the like.

The separation defined herein is effectively carried out merely by bringing the chlorotoluene isomers into contact with HF, $BF_3$ and an organic diluent, preferably a saturated hydrocarbon having up to about sixteen carbon atoms, for example, hexane, at a temperature between about $-30°$ and about $60°$ C., preferably between about $0°$ and $30°$ C. Thus, the technique employed involves partitioning the chloroaromatics between a liquid HF layer and an organic layer; $BF_3$ effecting selective removal of meta-chlorotoluene to the HF layer by complex formation.

The maximum extraction temperature of about 60° C. is critical since fragmentation and alkylation of the aromatics could occur at higher temperatures. In addition, the temperature and charge, i.e., the relative molar amounts of chlorotoluene, HF, $BF_3$, diluent and other constituents, should be chosen to insure that the HF layer will be more dense than the organic layer since high meta-chlorotoluene selectively results only when the lowest layer is the extracting acid layer. In this connection, the addition of a light, inert diluent, such as hexane, is necessary since the organic layer would assume the lower-most position in an extraction vessel if HF, $BF_3$ chlorotoluene and chlorobenzene were the only components in the system.

In a preferred embodiment anhydrous HF and hexane are added to a closed vessel containing chlorobenzene and the three chlorotoluene isomers, after which $BF_3$ gas is added thereto. The molar ratio of HF and $BF_3$ (as a combined entity) to the chlorotoluene charge can be from about 1:1 to about 100:1, the preferred ratio being from about 5:1 to about 50:1. The molar ratio of chlorobenzene to chlorotoluene is not critical since the selectivity of the extraction appears to be independent of the presence of chlorobenzene. The molar ratio of hexane to the chlorotoluene charge is determined by the amount of hexane required to render the organic layer less dense than the HF layer. Accordingly, the molar ratio of hexane to chlorotoluene can be from about 0.1:1 to about 100:1, preferably from about 0.2:1 to about 5:1. The contents of the extraction vessel are then stirred and the temperature thereof is maintained between about $-30°$ C. and about $60°$ C., preferably between about $0°$ and about $30°$ C. As indicated above, temperatures in excess of about $60°$ C. could cause an undesirable hexane isomerization and fragmentation and alkylation of the aromatics. The pressure in the extraction vessel can be as low as about 15 pounds per square inch gauge and as high as about 1800 pounds per square inch gauge, but it is preferred that the pressure be maintained between about 100 and about 800 pounds per square inch gauge. In this connection, it appears that while almost any pressure that is sufficiently high to maintain the HF in a liquid state may be employed, pressures in the range of about 450 to about 600 pounds per square inch are the most preferred.

The residence time or contact time between the chlorotoluene and the HF, BF$_3$ and hexane is dependent upon the various factors discussed hereinabove and, accordingly, can be widely varied. However, the residence time should generally be from about 0.1 to about 60 minutes, and preferably from about 0.1 to about 0.5 hour.

At the end of the indicated residence time stirring is terminated and three distinct phases appear in the extraction vessel. The uppermost phase is composed almost entirely of BF$_3$, which under the conditions defined herein is always in the gaseous phase. The intermediate phase is a liquid organic layer containing a combination of the three isomers of chlorotoluene, hexane, chlorobenzene, if any is present in the system, and other organic diluents and disproportionation products, if any. The lowermost phase is also a liquid and contains liquid HF having meta-chlorotoluene selectively dissolved therein in the form of a meta-chlorotoluene·HF·BF$_3$ complex. The HF layer also contains complexes or ortho- and para-chlorotoluene and some chlorobenzene and disproportionation products, if the latter are formed. However, due to the high selectivity of the HF layer for meta-chlorotoluene, the chlorotoluene present in the HF layer is from about 60 to about 80 percent meta-chlorotoluene, as opposed to about 30 to 35 percent meta-chlorotoluene present in the charge. The contents of meta-chlorotoluene in the HF layer can be further increased to about 90 percent of the total chlorotoluene content by performing a second stage extraction under the same conditions outlined above.

As indicated above, the present extraction process requires the use of a light, inert diluent, such as saturated aliphatic hydrocarbons having up to about sixteen carbon atoms, benzene, 1-chlorodocecane, etc., to cause the HF layer to be the lowermost in the extraction vessel. We have found that the use of such diluent assists in the selectivity of the meta-chlorotoluene extraction far beyond literature dictated expectations. For example, while the use of an inert diluent in a meta-xylene extraction system improves selectivity less than about 5 percent, the selectivity of meta-chlorotoluene extraction is enhanced by about 100 percent (from about 30 to 35 percent meta-chlorotoluene in the charge to about 60 to 80 percent meta-chlorotoluene in the HF layer).

The process defined herein can further be illustrated by the following. In a typical run, chlorobenzene, a three isomer mixture of chlorotoluenes and a diluent, such as hexane, were placed in a 300 ml. stainless steel autoclave equipped with a stirrer, an internal cooling coil and an external heating mantle. After cooling to less than 0° C., anhydrous HF was condensed into the autoclave and BF$_3$ was pressured in, the amounts charged being determined by the weight losses of the lecture bottles from which each material was taken. Heat was applied to the stirred autoclave until the indicated temperature was reached and that temperature was maintained for about 0.1 to 0.5 hour. The pressure that developed within the autoclave at the indicated temperature was recorded. Stirring was terminated and the contents of the autoclave allowed to separate into a lower HF layer, an intermediate liquid organic layer and an upper gaseous BF$_3$ phase. The HF layer and the organic layer were withdrawn from the autoclave via a bottom drain onto cracked ice in separate polyethylene vessels, whereafter the excess gaseous BF$_3$ phase was vented. The resulting aqueous HF and aqueous organic mixtures were worked up separately. Each was extracted twice with hexane, the extracts being combined and washed free of acid first with water, then with a 2 percent aqueous solution of sodium bicarbonate; solutions were finally dried over sodium sulfate and analyzed by gas chromatography employing an 80′ x 1/8″ stainless steel column packed with 15 percent p-azoxyanisole on acid washed 30/60 mesh Chromosorb W and a 10′ x 1/8″ stainless steel column packed with 20 percent FFAP on acid washed, DMCS treatment, 70/80 mesh Chromosorb W both operated at 120° C. The results obtained are tabulated below in Tables 1 and 2.

It should be understood that the above-described example relates to a laboratory technique, and that the various manipulative procedures are intended to facilitate the handling of materials on a laboratory scale. Accordingly, while the liquid HF and organic layers are described as being drained onto ice in separate containers, it should be appreciated that larger scale operations would employ a more commercially economic procedure. Thus, the layers would be withdrawn separately into suitable dry vessels whereafter the components thereof would be physically separated, for example, by distillation. It should also be understood that the detailed reference herein to hexane as a preferred diluent is intended to be demonstrative of the effectiveness of saturated hydrocarbons generally. In this connection, it has been found that the effectiveness of the diluent employed is related primarily to the bulk properties thereof, such as, inertness to the acid environment, low polarity and low density; effectiveness is much less related to the diluent's molecular properties. Accordingly, it should be appreciated that any saturated hydrocarbon having a density lower than that of the respective chlorotoluenes can be employed with substantially the same beneficial results.

TABLE 1.—META-CHLOROTOLUENE EXTRACTION WITH HF-BF$_3$

| Run No. | Charge, mols CT CB | Charge, mols HF BF$_3$ | Charge, mols Hexane DCB | Molar ratios CB/CT | Molar ratios HF/CT BF$_3$/CT | Extraction Temp., °C. | Extraction Pressure, p.s.i.g. |
|---|---|---|---|---|---|---|---|
| 1 | 0.0845 / 0.0889 | 2.91 / 0.837 | 0 / 0 | 1.05 | 34.4 / 9.90 | 19 | 495 |
| 2 | 0.0845 / 0.0888 | 2.58 / 0.702 | 0 / 0 | 1.05 | 30.5 / 8.31 | 83 | 760 |
| 3 | 0.158 / 0.160 | 1.79 / 0.347 | 0 / 0 | 1.01 | 11.3 / 2.20 | 105 | 550 |
| 4 | 0.0845 / 0.178 | 3.06 / 0.712 | 0 / 0 | 2.10 | 36.2 / 8.41 | 83 | 750 |
| 5 | 0.0837 / 0.178 | 3.08 / 0.678 | 0 / 0 | 2.13 | 36.8 / 8.10 | 83 | 725 |
| 6 | 0.109 / 0.231 | 3.95 / 0.600 | 0 / 0 | 2.12 | 36.2 / 5.50 | 80 | 630 |
| 7 | 0.0846 / 0.105 | 2.96 / 0.668 | 0.0760 / 0 | 1.24 | 35.0 / 7.90 | 80 | 680 |
| 8 | 0.0845 / 0.0889 | 3.03 / 0.819 | 0.039 / 0 | 1.05 | 35.9 / 9.68 | 20 | 485 |
| 9 | 0.0845 / 0.0889 | 3.05 / 0.838 | 0.152 / 0 | 1.05 | 36.1 / 9.92 | 21 | 500 |
| 10 | 0.0845 / 0.0489 | 3.04 / 0.839 | 0.152 / 0 | 0.58 | 36.0 / 9.91 | 20 | 485 |
| 11 | 0.0869 / 0.0889 | 1.55 / 0.766 | 0.152 / 0 | 1.02 | 17.8 / 8.82 | 20 | 540 |
| 12 | 0.0845 / 0 | 3.06 / 0.833 | 0.152 / 0 | 0 | 36.2 / 9.85 | 21 | 492 |
| 13 | 0.0845 / 0 | 1.80 / 0.866 | 0.152 / 0 | 0 | 21.3 / 10.2 | 21 | 590 |
| 14 | 0.0836 / 0 | 1.59 / 0.795 | 0.152 / 0 | 0 | 19.0 / 9.48 | 21 | 545 |
| 15 | 0.0845 / 0 | 1.39 / 0.261 | 0.152 / 0 | 0 | 16.5 / 3.09 | 21 | 205 |

| Run No. | Layer [1] | Distribution between layers CB | Distribution between layers CT | Distribution between layers DCB | Chlorotoluene isomer distribution Ortho- | Chlorotoluene isomer distribution Meta- | Chlorotoluene isomer distribution Para- |
|---|---|---|---|---|---|---|---|
| 1 | Charge | | | | 51.9 | 34.4 | 13.7 |
| | Raffinate | 55.7 | 51.3 | | 57.7 | 27.1 | 15.2 |
| | Extract | 44.3 | 48.7 | | 45.8 | 42.1 | 12.1 |
| 2 | Charge | | | | 51.7 | 35.6 | 12.7 |
| | Raffinate | 82.2 | 86.1 | | 53.0 | 34.2 | 12.8 |
| | Extract | 17.8 | 13.9 | | 43.5 | 44.1 | 12.4 |
| 3 | Charge | | | | 51.9 | 35.1 | 13.0 |
| | Raffinate | 83.4 | 87.2 | | 52.6 | 34.5 | 12.9 |
| | Extract | 16.6 | 12.8 | | 47.0 | 38.7 | 14.3 |
| 4 | Charge | | | | 51.0 | 35.9 | 13.1 |
| | Raffinate | 80.8 | 84.0 | | 52.5 | 34.4 | 13.2 |
| | Extract | 19.2 | 16.0 | | 43.2 | 44.6 | 12.2 |
| 5 | Charge | | | | 77.8 | 17.9 | 4.1 |
| | Raffinate | 80.5 | 84.8 | | 81.5 | 14.8 | 3.5 |
| | Extract | 19.5 | 15.2 | | 57.1 | 35.3 | 7.6 |
| 6 | Charge | | | | 49.4 | 37.1 | 13.5 |
| | Raffinate | 83.1 | 87.5 | | 50.3 | 36.0 | 13.7 |
| | Extract | 16.9 | 12.5 | | 43.3 | 44.4 | 12.3 |
| 7 | Charge | | | | 52.1 | 35.1 | 12.8 |
| | Raffinate | 87.0 | 90.1 | 93.0 | 53.1 | 34.0 | 12.9 |
| | Extract | 13.0 | 9.9 | 7.0 | 42.5 | 45.5 | 12.1 |
| 8 | Charge | | | | 53.5 | 32.3 | 14.2 |
| | Extract | 5.7 | 11.4 | | 20.2 | 73.7 | 6.2 |
| | Raffinate | 94.3 | 88.6 | | 57.9 | 26.9 | 15.0 |

See footnote at end of table.

TABLE 1.—Continued

| Run No. | Layer [1] | Distribution between layers | | | Chlorotoluene Isomer distribution | | |
|---|---|---|---|---|---|---|---|
| | | CB | CT | DCB | Ortho- | Meta- | Para- |
| 9 | Charge | | | | 52.9 | 34.0 | 13.1 |
| | Extract | 5.1 | 10.7 | | 20.4 | 75.0 | 4.6 |
| | Raffinate | 94.9 | 89.3 | | 56.8 | 29.1 | 14.1 |
| 10 | Charge | | | | 20.3 | 73.3 | 6.4 |
| | Extract | 11.1 | 25.1 | | 8.0 | 89.6 | 2.4 |
| | Raffinate | 88.9 | 74.9 | | 24.4 | 67.9 | 7.7 |
| 11 | Charge | | | | 52.3 | 34.4 | 13.3 |
| | Extract | 3.9 | 6.5 | | 24.4 | 68.6 | 7.0 |
| | Raffinate | 96.1 | 93.6 | | 54.2 | 32.0 | 13.8 |
| 12 | Charge | | | | 52.9 | 33.8 | 13.3 |
| | Extract | | 15.0 | | 23.3 | 70.1 | 6.6 |
| | Raffinate | | 85.0 | | 58.1 | 27.4 | 14.5 |
| 13 | Charge | | | | 22.2 | 71.3 | 6.5 |
| | Extract | | 22.3 | | 8.4 | 88.8 | 2.8 |
| | Raffinate | | 77.7 | | 26.1 | 66.3 | 7.6 |
| 14 | Charge | | | | 52.6 | 34.2 | 13.2 |
| | Extract | | 6.8 | | 22.3 | 72.3 | 5.4 |
| | Raffinate | | 93.2 | | 54.9 | 31.4 | 13.7 |
| 15 | Charge | | | | 52.1 | 35.3 | 12.6 |
| | Extract | | 2.9 | | 26.5 | 66.1 | 7.4 |
| | Raffinate | | 97.1 | | 52.8 | 34.4 | 12.8 |

[1] First layer listed is lowest in the reactor and the first to be removed via the bottom drain.

CT = Chlorotoluene.
CB = Chlorobenzene.
DCB = Ortho-dichlorobenzene.
Extract = HF layer; Raffinate = Organic layer.

TABLE 2.—META-CHLOROTOLUENE EXTRACTION WITH HF-BF$_3$, DILUENT VARIATION

| Run No. | Diluent | Charge, mols | | Dilu-ent | Volumn ratio, diluent/CA [1] | Extraction | |
|---|---|---|---|---|---|---|---|
| | | CT CB | HF BF$_3$ | | | Temp., °C. | Pressure, p.s.i.g. |
| 16 | None | 0.0845 0.0889 | 2.91 0.837 | | | 19 | 49 |
| 17 | Hexane | 0.0845 0.0889 | 3.05 0.838 | 0.152 | 1.0 | 21 | 500 |
| 18 | Benzene | 0.0847 0.0889 | 3.20 0.771 | 0.226 | 1.0 | 24 | 470 |
| 19 | n-Butane | 0.0846 0.0888 | 3.00 0.740 | 0.126 | 0.8 | 25 | 502 |
| 20 | 1-chloro-dodecane | 0.0845 0.0888 | 3.18 0.690 | 0.083 | 1.0 | 23 | 430 |

| Run No. | Layer [2] | Component distribution between layers | | | Chlorotoluene isomer distribution | | |
|---|---|---|---|---|---|---|---|
| | | Diluent | CB | CT | Ortho- | Meta- | Para- |
| 16 | Charge | | | | 51.9 | 34.4 | 13.7 |
| | Raffinate | | 55.7 | 51.3 | 57.7 | 27.1 | 15.2 |
| | Extract | | 44.3 | 48.7 | 45.8 | 42.1 | 12.1 |
| 17 | Charge | | | | 52.9 | 34.0 | 13.1 |
| | Extract | 3.2 | 5.7 | 11.4 | 20.4 | 75.0 | 4.6 |
| | Raffinate | 96.8 | 94.3 | 88.6 | 56.8 | 29.1 | 14.1 |
| 18 | Charge | | | | 51.4 | 33.2 | 15.4 |
| | Extract | 16.0 | 8.9 | 14.9 | 31.1 | 59.3 | 9.6 |
| | Raffinate | 84.0 | 91.1 | 85.1 | 55.0 | 28.7 | 16.3 |
| 19 | Charge | | | | 51.9 | 32.8 | 15.4 |
| | Extract | | 14.2 | 17.1 | 37.9 | 50.6 | 11.5 |
| | Raffinate | | 85.9 | 82.9 | 54.6 | 29.1 | 16.3 |
| 20 | Charge | | | | 51.5 | 33.2 | 15.3 |
| | Extract | 10.0 | 27.8 | 24.7 | 35.6 | 46.3 | 18.1 |
| | Raffinate | 90.0 | 72.2 | 75.3 | 43.2 | 37.8 | 19.0 |

[1] CA = CB + CT.
[2] First layer listed is lowest in the reactor and the first to be removed.
Extract = HF layer.
Raffinate = Organic layer.

The data in the above tables clearly illustrate the advantages of operation in accordance with the defined procedure. The initial results in Runs Nos. 1, 2 and 3 demonstrate that the degree of selectivity, with respect to the removal of meta-chlorotoluene from a mixture of chlorotoluene isomers, is poor when a simple HF—BF$_3$-chloroaromatic system is employed. Run No. 4 illustrates that meta-chlorotoluene selectivity cannot be improved by merely increasing the density of the organic layer by increasing the proportion of chlorobenzene in the charge. Likewise, as illustrated in Run No. 7, the addition of the more dense dichlorobenzene as a diluent in the system fails to increase the selectivity for meta-chlorotoluene. The data also indicates that, in the absence of a light organic diluent, selectivity is substantially insensitive to changes in the molar ratio of BF$_3$ to chlorotoluene and/or the pressure in the autoclave (compare Run Nos. 3, 4 and 6). While the ratio of meta-chlorotoluene in the extract in Run No. 4 is greater than that in Run No. 5, the relative increase of the ratio of meta-chlorotoluene, when comparing the respective charges in Run Nos. 4 and 5, indicates that selectivity depends upon the isomer distribution in the charge and that greater proportional increases in selectivity are witnessed when the charge has a lower meta-chlorotoluene content.

A comparison of Run No. 1 with Run Nos. 8 and 9 clearly demonstrates the decidedly improved selectivity of meta-chlorotoluene extraction when hexane is added to the charge. Run Nos. 8 and 9 also illustrate the relative insensitivity of the selectivity on the amount of hexane added.

As indicated above, the selectivity of the metachlorotoluene extraction can be greatly improved by conducting a second stage extraction. In this connection, Run No. 10 illustrates that a second stage extraction of a charge containing about 73 percent meta-chlorotoluene (obtained by a first stage extraction in accordance with the present invention) can increase the meta-chlorotoluene content in the second stage extract to almost 90 percent. The data also indicates that the quantity of chlorotoluene removed to the extract decreases as the molar ratio of HF to chlorotoluene decreases, but that the degree of selectivity remains substantially unimpaired (compare Run Nos. 9 and 11). Consideration of Run Nos. 9 and 12 indicates that the selectivity of the extraction is almost independent of the presence of chlorobenzene but that the actual quantity of chlorotoluene decreases when chlorobenzene is present in the charge. In addition, second stage extraction in the absence of chlorobenzene is substantially as selective as that performed in the presence of chlorobenzene (compare Run Nos. 10 and 13). Finally, Run Nos. 13, 14 and 15 indicate that as molar ratios of HF to chlorotoluene and BF$_3$ to chlorotoluene and the pressure decrease, the quantity of chlorotoluene extracted decreases. It appears that the optimum conditions for meta-chlorotoluene extraction are illustrated in Run Nos. 8 and 9.

The data in Table 2 further illustrate the advantages of operation in accordance with the defined procedure. These data serve to extend the identity of the useful diluents beyond normally liquid saturated hydrocarbons, such as, for example, hexane, to aromatic hydrocarbons, normally gaseous saturated hydrocarbons and halogenated hydrocarbons, such as, for example, benzene, n-butane and 1-chlorodecane, respectively. Although not as effective as hexane, the diluents illustrated in Table 2 (Run Nos. 16–20) influence the selectivity of meta-chlorotoluene extraction beyond that observed by operating without a diluent.

It is to be understood that the above-described embodiments are merely illustrative of the principles of the present invention and that many variations and modifications may be devised which will fall within the spirit and scope thereof.

We claim:

1. A process for recovering meta-chlorotoluene from a mixture selected from the group consisting of (a) meta-chlorotoluene and isomers thereof and (b) chlorobenzene, meta-chlorotoluene and isomers of meta-chlorotoluene which comprises contacting the mixture with liquid HF, BF$_3$ and an inert organic diluent selected from the group consisting of butane, pentane, hexane, heptane, octane, benzene and 1-chlorododecane, wherein the molar ratio of HF and BF$_3$, as a combined entity, to the chlorotoluene charge is from about 1:1 to about 100:1, at a temperature of about −30° to about 60° C. and a pressure of about 15 to about 1800 pounds per square inch gauge over a period of about 0.1 to about 60 minutes, whereby an HF layer is obtained having dissolved therein meta-chlorotoluene complexed with HF.

2. The process of claim 1 wherein such contact is made at a temperature of from about 0° to about 30° C.

3. The process of claim 1 wherein the residence time is from about 0.1 to about 0.5 hour.

4. The process of claim 1 wherein said inert organic diluent is hexane.

5. The process of claim 1 wherein the molar ratio of HF to $BF_3$ is from about 10:1 to about 2:1.

6. The process of claim 1 wherein the molar ratio of combined HF and $BF_3$ to meta-chlorotoluene and the isomers thereof is from about 50:1 to about 5:1.

7. The process of claim 1 wherein chlorobenzene is also present in said mixture.

8. The process of claim 7 wherein such contact is made at a temperature of from about 0° to about 30° C.

9. The process of claim 7 wherein the residence time is from about 0.1 to about 0.5 hour.

10. The process of claim 7 wherein said inert organic diluent is hexane.

11. The process of claim 7 wherein said inert organic diluent is a member selected from the group consisting of butane, pentane, hexane, heptane, octane, benzene and 1-chlorododecane.

12. The process of claim 7 wherein the molar ratio of HF to $BF_3$ is from about 10:1 to about 2:1.

13. The process of claim 7 wherein the molar ratio of combined HF and $BF_3$ to meta-chlorotoluene and the isomers thereof is from about 50:1 to about 5:1.

References Cited

UNITED STATES PATENTS

| | | | |
|---|---|---|---|
| 2,727,075 | 12/1955 | Mattano | 260—650 R |
| 2,819,321 | 1/1958 | Pray | 260—650 R |
| 2,881,224 | 4/1959 | McCaulay et al. | 260—650 R |

HOWARD T. MARS, Primary Examiner

UNITED STATES PATENT OFFICE
CERTIFICATE OF CORRECTION

Patent No. 3,655,783  Dated April 11, 1972

Inventor(s) John D. Bacha and Charles M. Selwitz

It is certified that error appears in the above-identified patent and that said Letters Patent are hereby corrected as shown below:

Column 4, Table 1, Runs 7 and 8, under "Para-", "12.1" should be "12.0"; "6.2" should be "6.1"; and "15.0" should be "15.2".

Column 5, Table 2, Run 16, under "Pressure ...", "49" should be "495".

Signed and sealed this 21st day of November 1972.

(SEAL)
Attest:

EDWARD M. FLETCHER, JR.
Attesting Officer

ROBERT GOTTSCHALK
Commissioner of Patents